United States Patent
De Lathauwer et al.

(10) Patent No.: US 9,968,034 B2
(45) Date of Patent: May 15, 2018

(54) HEADER CARRYING STRUCTURE FOR COMBINE

(71) Applicant: CNH Industrial America LLC, New Holland, PA (US)

(72) Inventors: Tom A. De Lathauwer, Lede (BE); Sam Reubens, Sint-Michiels (BE)

(73) Assignee: CNH Industrial America LLC, New Holland, PA (US)

( * ) Notice: Subject to any disclaimer, the term of this patent is extended or adjusted under 35 U.S.C. 154(b) by 38 days.

(21) Appl. No.: 15/164,439

(22) Filed: May 25, 2016

(65) Prior Publication Data
US 2016/0345498 A1    Dec. 1, 2016

(30) Foreign Application Priority Data
May 29, 2015   (BE) .................................. 2015/0150

(51) Int. Cl.
| | | |
|---|---|---|
| *A01D 43/00* | (2006.01) | |
| *A01D 67/00* | (2006.01) | |
| *A01D 41/14* | (2006.01) | |
| *A01D 41/06* | (2006.01) | |
| *A01D 61/00* | (2006.01) | |

(52) U.S. Cl.
CPC ........... *A01D 67/005* (2013.01); *A01D 41/06* (2013.01); *A01D 41/14* (2013.01); *A01D 61/008* (2013.01)

(58) Field of Classification Search
CPC .... A01D 41/16; A01D 41/145; A01D 75/287; A01D 41/14; A01D 41/06; A01D 67/00; A01B 59/062; Y10S 56/09
See application file for complete search history.

(56) References Cited

U.S. PATENT DOCUMENTS

| | | | | |
|---|---|---|---|---|
| 3,116,075 A | * | 12/1963 | Hershman ............ | A01B 59/062 172/272 |
| 3,238,709 A | * | 3/1966 | Williams ............... | A01D 41/14 116/DIG. 13 |
| 3,324,637 A | * | 6/1967 | Windsor ................ | A01D 41/16 56/15.6 |
| 3,488,930 A | * | 1/1970 | Bernhard ............... | A01D 41/16 56/11.9 |
| 3,638,407 A | * | 2/1972 | Togami .................. | A01D 41/16 56/15.6 |

(Continued)

FOREIGN PATENT DOCUMENTS

| | | |
|---|---|---|
| FR | 1407837 | 8/1965 |
| GB | 1348830 | 3/1974 |

*Primary Examiner* — Arpad Fabian-Kovacs
(74) *Attorney, Agent, or Firm* — Peter K. Zacharias; Patrick M. Sheldrake

(57) ABSTRACT

An agricultural combine including a front end adapted for carrying a header via a feeder and an actuator. The combine includes a first connecting structure at an upper segment of the front end, and a second connecting structure at a lower segment of the front end. The combine further includes an intermediate frame including a feeder connector adapted for connecting to the feeder. The intermediate frame further includes a first connector connecting to the first connecting structure and a second connector connecting to the second connecting structure. The combine further includes an actuator connector adapted for connecting to the actuator. The actuator connector is provided at a location of the second connecting structure.

21 Claims, 3 Drawing Sheets

(56) References Cited

U.S. PATENT DOCUMENTS

| | | | | |
|---|---|---|---|---|
| 3,665,688 A * | 5/1972 | Sheehan | A01D 41/14 | 56/14.6 |
| 3,731,470 A * | 5/1973 | Cornish | A01D 75/285 | 280/124.128 |
| 4,253,295 A * | 3/1981 | Knepper | A01D 41/16 | 56/15.6 |
| 4,266,391 A * | 5/1981 | McDuffie | A01D 41/14 | 56/14.5 |
| 4,266,392 A * | 5/1981 | Knepper | A01D 41/14 | 56/14.5 |
| 4,266,395 A * | 5/1981 | Basham | A01D 75/287 | 56/16.2 |
| 4,267,687 A | 5/1981 | Neuhring | | |
| 4,280,317 A * | 7/1981 | Lindblom | A01D 41/16 | 56/15.6 |
| 4,313,294 A * | 2/1982 | Martenas | A01D 41/145 | 56/15.8 |
| 4,315,395 A | 2/1982 | Randall et al. | | |
| 4,724,661 A * | 2/1988 | Blakeslee | A01D 43/107 | 56/15.8 |
| 4,733,523 A * | 3/1988 | Dedeyne | A01D 41/145 | 56/10.2 E |
| 4,742,671 A * | 5/1988 | Bich | A01D 41/145 | 56/15.6 |
| 5,918,448 A * | 7/1999 | Wheeler | A01D 75/287 | 56/10.2 E |
| 6,318,057 B1 * | 11/2001 | Burmann | A01D 41/16 | 56/10.2 R |
| 6,421,993 B1 | 7/2002 | Mackin et al. | | |
| 6,560,953 B2 * | 5/2003 | Rauch | A01D 75/187 | 56/11.2 |
| 6,735,929 B2 * | 5/2004 | Watts | A01B 71/06 | 56/14.9 |
| 8,631,634 B2 * | 1/2014 | Vereecke | A01D 41/16 | 56/14.9 |
| 8,826,635 B2 * | 9/2014 | Schraeder | A01D 41/145 | 56/10.2 E |
| 9,137,946 B2 * | 9/2015 | Verhaeghe | A01D 41/16 | |
| 2002/0005033 A1 * | 1/2002 | Uhlending | A01D 75/287 | 56/10.2 R |
| 2005/0016146 A1 * | 1/2005 | Shidler | A01D 41/127 | 56/16.4 R |
| 2012/0102905 A1 * | 5/2012 | Dold | A01D 41/16 | 56/12.7 |
| 2013/0097986 A1 * | 4/2013 | Lovett | A01D 41/14 | 56/153 |
| 2014/0237980 A1 | 8/2014 | Verhaeghe et al. | | |
| 2015/0121829 A1 * | 5/2015 | Duquesne | A01D 41/16 | 56/11.9 |
| 2016/0057934 A1 * | 3/2016 | Dreer | A01D 41/142 | 56/13.5 |

* cited by examiner

HEADER CARRYING STRUCTURE FOR COMBINE

CROSS REFERENCE TO RELATED APPLICATION

This application claims priority to Belgium Application No. 2015/0150, filed May 29, 2015, the contents of which are incorporated herein by reference.

FIELD OF THE INVENTION

The present invention relates to an agricultural combine and, particularly, to a header carrying structure of the agricultural combine.

BACKGROUND OF THE INVENTION

There is a trend in agricultural industries towards larger equipment. One of the consequences is that the headers for agricultural combines become wider and heavier. The increasing weight of the header particularly requires a strong and rigid connection to the main frame of the agricultural combine.

Headers are typically connected to a front end of the agricultural combine via a feeder and an actuator. The feeder is connected to an upper segment of the front end of the agricultural combine while the actuator is connected to a lower segment of the front end of the agricultural combine. Both the feeder and the actuator are pivotally connected to the front end of the combine so that by operating the actuator, the height of the header with respect to the combine body can be adapted. The header is adapted to gather crop material from a field and to transport the crop material via the feeder towards the body of the agricultural combine.

Additional or optional crop processing features can be added to the agricultural combine by mounting a module between the feeder and the body of the agricultural combine. An example of such additional or optional features is a stone remover, which is known in the art as a dynamic feed roll (DFR) mechanism or module. Such module is typically firmly bolted to the upper segment of the front end of the agricultural combine, and the feeder is connected to the module so that the crop material is transported from the feeder through the module to the body of the agricultural combine.

A drawback of the current situation with the dynamic feed roll module is that all forces and tensions resulting from carrying the header are transmitted via the module to the agricultural combine. This requires the connection between the module and the agricultural combine, as well as the frame structure of the module itself, to be extremely rigid. On the one hand, such extremely rigid connection and module increases the weight of the agricultural combine, and on the other hand it increases the costs.

It is an object of the present invention to provide a more cost and weight efficient connection between the header and the agricultural combine.

SUMMARY OF THE INVENTION

In accordance with an aspect of the present invention, there is provided an agricultural combine with a front end adapted for carrying a header via a feeder and an actuator. The agricultural combine comprises a first connecting structure at an upper segment of the front end, and a second connecting structure at a lower segment of the front end. The agricultural combine further comprises an intermediate frame comprising a feeder connector adapted for connecting to the feeder. The intermediate frame comprises a first connecting means for connecting to the first connecting structure. An actuator connector for connecting the actuator is provided at a location of the second connecting structure. The intermediate frame further comprises a second connecting means for connecting to the second connecting structure.

The intermediate frame can optionally be provided with an additional or optional crop material processing mechanism such as a DFR. According to another aspect of the present invention, the intermediate frame is not only connected to the upper segment of the front end but is also directly connected to the lower segment of the front end of the combine. The feeder is typically connected to, or at least transmits most of its forces through, the upper segment of the front end, while the actuator is connected at a location of the lower segment of the front end of the combine. By connecting the intermediate frame to both the upper segment and the lower segment of the front end of the combine, forces that relate to carrying the header can be directly transmitted by the intermediate frame from the feeder to the actuator and vice versa.

Tests and simulations have shown that when the intermediate frame is connected to both the upper segment and the lower segment of the front end of the combine, the majority of the header carrying forces are transmitted from the feeder through the intermediate frame to the actuator and vice versa. This implies that the connection between the intermediate frame and the combine is significantly less stressed than in a situation where the intermediate frame would only be connected to the upper segment of the front end of the combine. Furthermore, since in the combine, in accordance with aspects of the present invention, the intermediate frame is capable of directly transmitting forces between the actuator and the feeder, rotational stresses on the intermediate frame are minimized. As a result, the intermediate frame, in accordance with aspects of the present invention, as well as the connection between the intermediate frame and the front end of the combine can be made lighter and cheaper.

An unexpected advantage is that the intermediate frame allows the elements of the combine to be standardized, or allows standardized and conventionally incompatible elements to be interconnected via the frame. Whether a DFR is added or not, the intermediate frame might be connected between the feeder and the combine so that a single feeder can be used in both situations. In contrast, where a DFR module was used in conventional situations, a short feeder was used while a long feeder was used when no DFR module was used. Furthermore, different combines can have slightly different designs of, particularly, the front end. The intermediate frame can be formed so that a single feeder fits all different combines, or multiple intermediate frames can be formed to allow interconnecting multiple designs of feeders with multiple designs of combines. In this manner, production and design costs can be significantly reduced by using a combine with an intermediate frame in accordance with aspects of the present invention.

Desirably, the intermediate frame comprises rigid structural elements interconnecting the feeder connector with the second connecting means and interconnecting the feeder connector with the first connecting means. The rigid structural elements are provided to efficiently transmit forces. Tests have shown that the majority of the forces resulting from carrying the header are transmitted between, on the one hand, the feeder connector and the upper segment of the front end of the combine, which comprises the first connecting structure, and, on the other hand, between the feeder connector and the actuator connector, which is located at the lower segment of the front end of the combine where the second connecting structure is provided. Therefore, by providing rigid structural elements between these locations, forces can by optimally transmitted through the intermediate frame.

Desirably, the second connecting means is formed as a clamp for connection of the intermediate frame to the second connecting structure. The clamp and the second connecting structure are provided to enable a rotation of the intermediate frame with respect to the second connecting structure when the clamp is engaged with the second connecting structure. Tests and simulations have shown that a clamp provides a strong enough connection between the intermediate frame and the lower segment of the front end of the combine. By allowing the clamp and the intermediate frame to rotate with respect to the agricultural combine, mounting and demounting of the intermediate frame is significantly facilitated. Particularly during maintenance of the agricultural combine, access at the front end can be required. By allowing the intermediate frame to rotate, one could disconnect the connection at the upper segment of the front end of the combine between the intermediate frame and the combine, and can then rotate the intermediate frame at least partially away from the front end by rotation around the clamp. This gives access to the body of the combine via the front end while the intermediate frame is only partially disconnected.

Complete removal of the intermediate frame requires the intermediate frame to be lifted off the lower segment of the front end of the combine to thereby disconnect the clamp from the second connecting structure. In practice, such lifting-off is simple and easy to correctly perform. A clamp is significantly easier to engage during mounting of the intermediate frame, and once the clamp has been engaged, the intermediate frame is correctly positioned with respect to the front end of the combine so that further connection, particularly at the upper segment of the front end of the combine, is facilitated. This reduces maintenance time and costs.

Desirably, the second connecting structure is formed as a beam traversing the lower front end of the agricultural combine. Further desirably, the clamp is formed as a substantially U-formed structure that is adapted to engage over the beam. A beam and a U-formed structure are easy to engage and disengage and provide a rigid connection.

Desirably, the first connecting means comprises multiple bolts adapted for rigidly connecting to the first connecting structure. The combination of a clamp at the lower segment and bolts at the upper segment proves to be a reliable and easy to achieve connection between the intermediate frame and the front end of the combine.

Desirably, the actuator connector is provided on the intermediate frame. Thereby, the intermediate frame desirably comprises rigid structural elements interconnecting the feeder connector with the actuator connector. By directly providing the actuator connector on the intermediate frame, a force transmitting triangle is achieved by the feeder, the actuator, and the intermediate frame. This means that the header carrying forces are transmitted inside the triangle. Thereby, an efficient and reliable structure is obtained for carrying the header.

Desirably, the intermediate frame is provided with a crop processing mechanism to process crop material between the feeder and the body of the combine. Further desirably, the crop processing mechanism is a dynamic feed roll mechanism for removing stones from the crop material.

Desirably, the feeder and the actuator are respectively connected to the feeder connector and the actuator connector. The feeder and actuator are interconnected at the location of a header mounting plate adapted for connecting the header.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE DRAWINGS

Figure 1A:
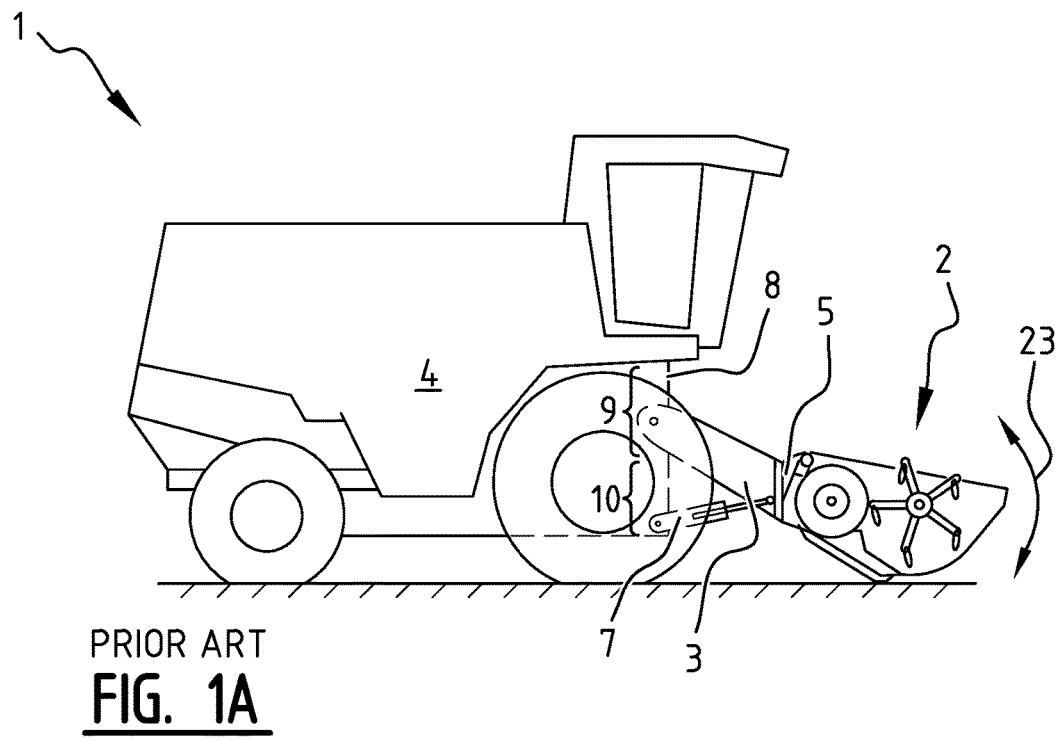
FIG. 1A illustrates a conventional header carrying system in which a header is connected to a front end of an agricultural combine via a feeder and an actuator.
Figure 1B:
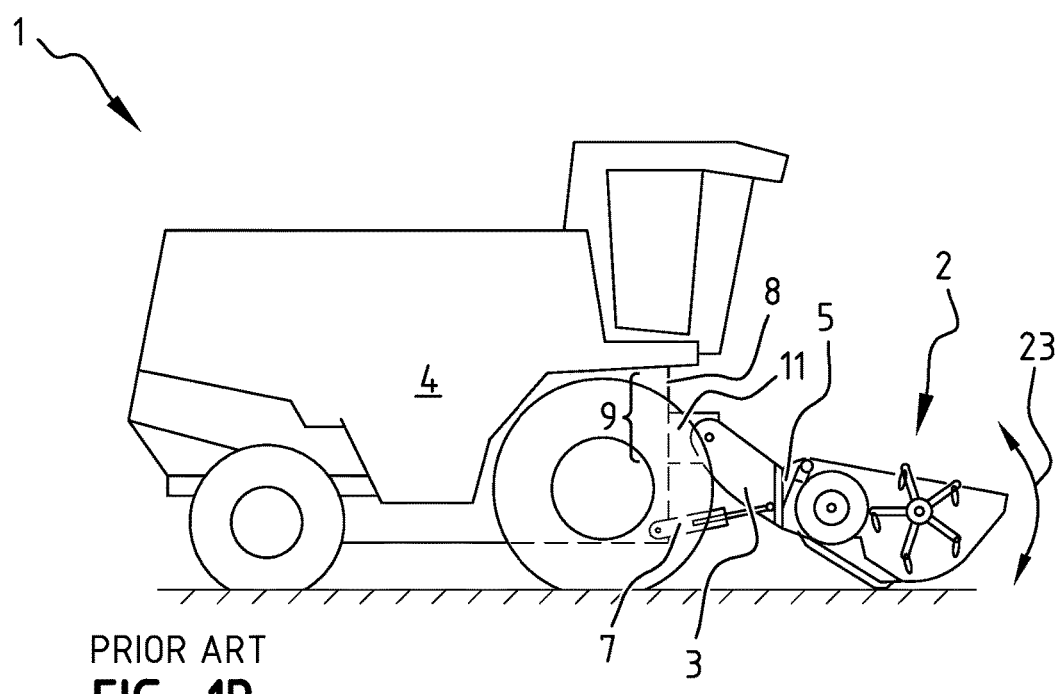
FIG. 1B illustrates a conventional header carrying system in which a header is connected to a front end of an agricultural combine via a feeder, an actuator, and an optional module.

FIGS. 1A and 1B show a conventional agricultural combine 1. The agricultural combine 1 carries a header 2 which is adapted for cutting and gathering crop material from a field. The crop material is transported through a feeder 3 to a body 4 of the agricultural combine 1 for further processing of the crop material. An exemplary embodiment of the present invention particularly relates to the connection between the body 4 of the agricultural combine 1 and the header 2.

FIG. 1A shows a conventional, known situation wherein a header 2 is connected to a front end 8 of the agricultural combine 1 via a feeder 3 and an actuator 7. The feeder 3 is connected to an upper segment 9 of a front end 8 of the combine 1 while the actuator 7 is connected to a lower segment 10 of the front end 8 of the combine 1. Both the feeder 3 and the actuator 7 are pivotally connected to the front end 8 of the combine 1 so that the header 2 can be moved up and down by adjusting the length of the actuator 7. The actuator 7 may be formed as one or more hydraulic cylinders. The feeder 3 and the actuator 7 are preferably interconnected at the location of a header mounting frame 5. The header mounting frame 5 can be connected to various sorts of headers 2 so that the agricultural combine 1 can serve multiple purposes and/or work with different lengths of headers 2. In FIG. 1A, the up and down movement of the header is illustrated with arrow 23.

FIG. 1B shows an alternative conventional configuration for mounting the header 2 to the body 4 of the agricultural combine 1. In the configuration of FIG. 1B, an additional or optional module 11 is mounted between the body 4 and the feeder 3. An example of such module 11 is a stone remover, which is known in the art as a dynamic feed roll module (DFR module). Such DFR module is conventionally bolted to the upper segment 9 of the front end 8 of the body 4 of the combine 1. In practice, the bolt pattern length is limited due to the limited height of the threshing frame front connection plane, whereby the cab frame is also bolted to this front plane, taking up height as well. This means that the outer bolts, being the most widely spaced bolts, carry the majority of the forces while the middle bolts hardly contribute to the connection. Lifting forces that result from carrying the header 2 pass through the feeder 3, the module 11, the upper segment 9 of the front end 8 of the combine 4, the lower segment 10 of the front end 8 of the combine 4, and the actuator 7. Since these forces can be significantly high, particularly due to the increasing width and weight of combine headers 2, the frame of the module 11 as well as the connection between the module 11 and the upper segment 9 of the front end 8 of the body 4 of the agricultural combine 1 should be made extremely strong.

A further disadvantage of the conventional configurations shown in FIG. 1A and in FIG. 1B is that the feeders 3 have different lengths. The feeder 7 in the configuration of FIG. 1A, where no DFR module is provided, is significantly longer than the feeder 3 in the configuration of FIG. 1B, where a DFR module 11 is provided. From a production point of view, it is suboptimal to have multiple feeders 3 with different lengths.

Another significant disadvantage of the configuration as shown in FIG. 1B relates to maintenance of the combine 1. Particularly when maintenance is required to inner elements of the body 4 near the front end 8 of the combine 1, access to the inside of the body 4 is preferably obtained via the front end 8. In the configuration of FIG. 1B, this requires the module 11 to be removed from the front end 8. As described above, due to the high forces that are transmitted through the module 11 as a result of carrying the header 2 and due to the module 11 having a strong frame, removal of this module 11 is cumbersome and time consuming.

Figure 2:
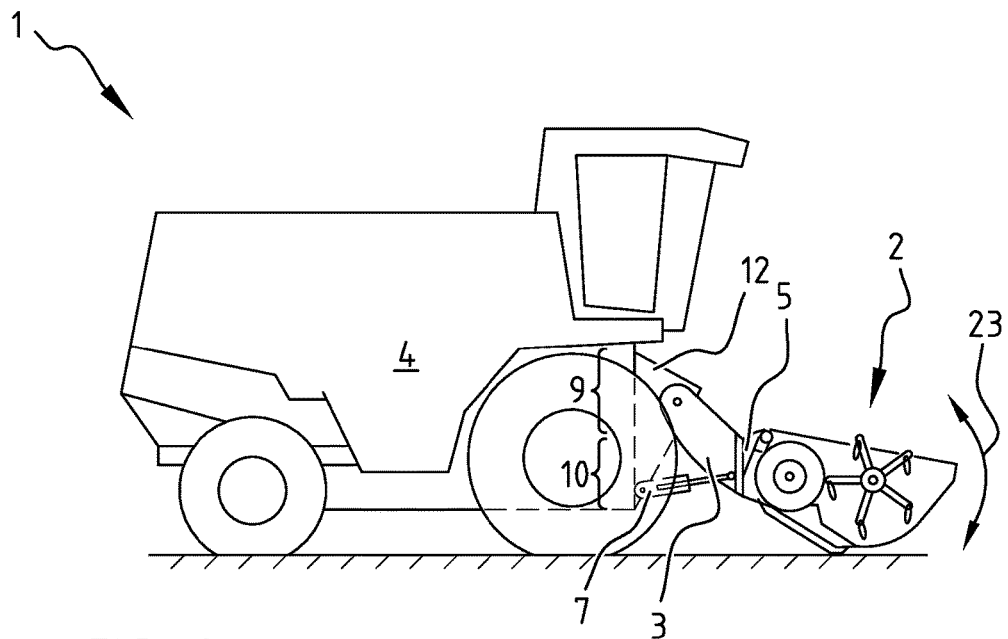
FIG. 2 illustrates a header carrying system, in accordance with an exemplary embodiment of the present invention.

FIG. 2 illustrates a header carrying system, in accordance with an exemplary embodiment of the present invention. In the configuration of FIG. 2, an intermediate frame 12 is mounted between the header 2 and the body 4 of the combine 1. The intermediate frame 12 extends over both the upper segment 9 and the lower segment 10 of the front end 8 of the body 4 of the combine 1. The intermediate frame 12 comprises a feeder connector 18 (illustrated in FIG. 3) for connecting to the feeder 3, and preferably also comprises an actuator connector 20 (illustrated in FIG. 3) for connecting to the actuator 7. As a result, the forces for lifting the header 2 are transmitted from feeder 3 directly through the intermediate frame 12 to the actuator 7. Thereby, forces related to lifting the header 2 are more optimally transmitted. Due to the larger connecting surface between the intermediate frame 12 and the front end 8 of the body 4 of the combine 1, forces relating to the weight of the header 2 can be optimally transmitted between the intermediate frame 12 and the combine 1.

In this context, forces relating to the weight of the header 2 are defined as the downward force acting on a gravitational center of the header 2 at a distance from the front end 8 of the body 4 of the combine 1. Forces relating to lifting the header 2 are defined as the forces that run through the actuator 7 and the feeder 3 as a result of the mechanical suspension system that carries the header 2.

The intermediate frame 12 is formed to be able to directly transmit crop material from the feeder 3 to the body 4 of the combine 1 and to be able to comprise a further processing mechanism such as a dynamic feed roll module 6 for processing the crop material between the feeder 3 and the body 4. Since the intermediate frame 12 is capable of both directly transmitting crop material as well as further processing crop material, the intermediate frame 12 can be placed between the header 2 and the body 4 of the combine 1 in all configurations. As a result, only a single feeder 3 is required for all configurations, which is an advantage for producing the feeders 3.

Figure 3:
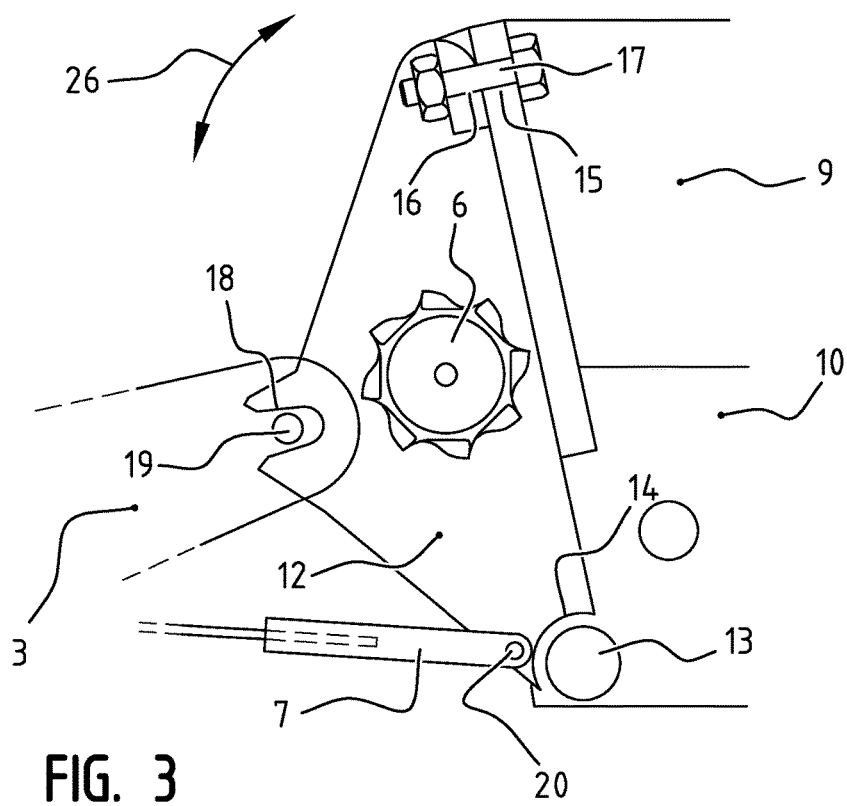
FIG. 3 illustrates an example of an intermediate frame with a stone remover mounted to a front end of a combine, in accordance with an exemplary embodiment of the present invention.

FIG. 3 is a detailed view of an exemplary embodiment of the intermediate frame 12, in accordance with an exemplary embodiment of the present invention. FIG. 3 further shows the lower segment 10 of the body 4 of the agricultural combine 1 and the upper segment 9 of the body 4 of the agricultural combine 1. The upper segment 9 comprises a first connecting structure 15 for connecting to the intermediate frame 12. In the example of FIG. 3, the first connecting structure 15 comprises a frame with one or more through holes for receiving bolts 17. The intermediate frame 12 comprises corresponding first connecting means 16 for interconnecting the intermediate frame 12 with the first connecting structure 15. In an exemplary embodiment, the first connecting means 16 may be the one or more bolts 17 acting as a first connector.

Figure 4:
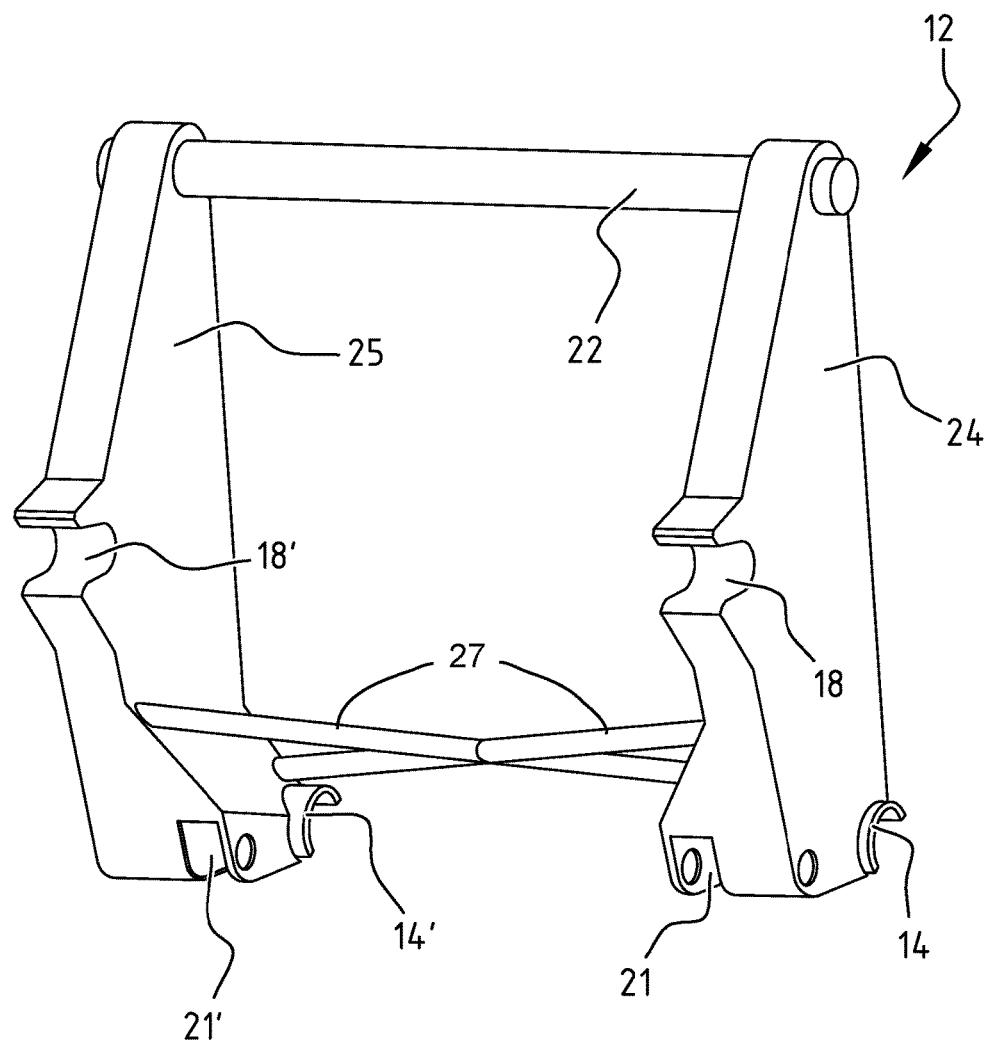
FIG. 4 shows a perspective view of another example of an intermediate frame without a stone remover, in accordance with an exemplary embodiment of the present invention.

Although the example of FIG. 3 shows a bolt 17 for connecting the intermediate frame 12 and the upper segment 9 of the front end 8 of the combine 1, it will be clear that other first connecting means 16 can be used. An example of another first connecting means 16 is a hook (not shown) rotatably mounted, for example, to the upper segment 9 of the front end 8 of the combine 1, and adapted to engage with a beam of the intermediate frame 12, which beam is illustrated in FIG. 4 with reference number 22. It will be clear that these examples are not limiting, and that a skilled person can use any suitable connecting means and corresponding connecting structure.

The lower segment 10 of the body 4 of the agricultural combine 1 comprises a second connecting structure. The second connecting structure is, in the example of FIG. 3, formed as a beam 13 extending along at least a part of the front end 8 of the combine 1. The intermediate frame 12 comprises a second connecting means for connecting to the second connecting structure 13, which second connecting means is formed in the example of FIG. 3 as a clamp 14 acting as a second connector. The clamp 14 matches with the beam 13 so that the clamp 14 can at least partially engage over the beam 13, thereby at least partially fixing the position of the intermediate frame 12 with respect to the body 4 of the combine 1. The clamp 14 is desirably formed as a substantially U-shaped frame structure wherein the opening of the U-shape is directed substantially downward, when the intermediate frame 12 in a mounted position. In this manner, the clamp 14 can be placed over the beam 13 so that forward or backward movement of the intermediate frame 12 with respect to the body 4 of the combine 1 is prevented.

Using a clamp 14 and a beam 13 as a second connecting means and a second connecting structure has significant advantages. Particularly during mounting and demounting of the intermediate frame 12, as well as during maintenance of the inner elements of the body 4 of the combine 1, the clamp 14 facilitates the handling of the intermediate frame 12. Due to the nature of the clamp 14 to beam 13 connection, the intermediate frame 12 is able to pivot around the beam 13 when the clamp 14 is engaged with the beam 13, which is indicated in FIG. 3 with arrow 26.

Simulations and tests show that such pivoting 26 has many advantages. During mounting of the intermediate frame 12, a relatively simple manipulation of the intermediate frame 12 allows placement of the clamp 14 over the beam 13. Thereby, the position of the intermediate frame 12 with respect to the body 4 of the combine 1 is at least partially determined. Then, the intermediate frame 12 can be pivoted 26 towards the front end 8 so that the first connecting structure 15 and the first connecting means 16 are aligned. This allows connection of the intermediate frame 12 to the upper segment 9 of the body 4 of the combine 1.

The intermediate frame 12 further comprises the feeder connector 18 for connecting to the feeder 3. The feeder connector 18 is adapted to receive a connection shaft 19 of the feeder 3 to interconnect the feeder 3 with the intermediate frame 12.

The intermediate frame 12 desirably comprises an actuator connector 20. The actuator connector 20 is located in proximity to the second connecting means 14. By providing the actuator connector 20 on the intermediate frame 12, forces relating to lifting the header 2 are directly transmitted from the feeder connector 18 to the actuator connector 20 through the intermediate frame 12. Therefore, the intermediate frame 12 desirably comprises rigid structural elements 24 and 25 (illustrated in FIG. 4) interconnecting the feeder connector 18 and the actuator connector 20. By providing the actuator connector 20 close to the second connecting means 14, forces relating to the weight of the header 2 can be easily transmitted to the body 4 of the combine 1. The intermediate frame 12 desirably further comprises rigid structural elements 24 and 25 (illustrated in FIG. 4) between the feeder connector 18 and the first connecting means 16 so that forces relating to the weight of the header 2 can be optimally transmitted to the body 4 of the combine 1. The intermediate frame 12 is further desirably shaped to maximize the distance between the first connecting means 16 and the second connecting means 14 so that the torque force resulting from the weight of the header 2 can be optimally transmitted to the front end 8 of the combine 1.

The intermediate frame 12 as shown in FIG. 3 has a further unexpected advantage relating to maintenance of the inner elements of the body 4. Such maintenance often requires an operator to be able to access the front end 8 of the combine 1. Conventionally, in the configurations of the FIGS. 1A and 1B, the header 2, feeder 3, and, if present, the module 11 must be demounted and removed from the front end 8 of the combine 1 to provide access to the operator. In the configuration as shown in FIG. 3, only the first connecting means 16 need be decoupled from the first connecting structure 15, and after this disconnection the complete assembly of intermediate frame 12, feeder 3, actuator 7, and even header 2 can pivot away from the front end 8 of the body 4 around beam 13, as is illustrated with arrow 26. This creates an opening for the operator to access the front end 8 of the body 4 of the combine 1, without the necessity of completely demounting and removing the header 2 and its carrying elements. This significantly facilitates maintenance operations.

FIG. 4 shows a perspective view of an example of an intermediate frame 12, in accordance with an exemplary embodiment of the present invention. The intermediate frame 12 comprises a pair of rigid frame structures 24 and 25 interconnected via a beam 22 and interconnecting elements 27. Each of the frame structures 24, 25 comprises a feeder connector 18, 18', a clamp 14, 14' for engagement over the beam 13 of the lower segment 10 of the body 4 of the combine 1, and an actuator connector 21, 21'. The intermediate frame 12 desirably has a width that substantially corresponds to the width of the feeder 3. In the example of FIG. 4, the structure elements 24, 25 are interconnected, at the location of the first connecting means 16, via the beam 22. As described above, this beam 22 can be used to connect the intermediate frame 12 to the upper segment 9 of the body 4 of the combine 1.

Although in FIG. 3 and in FIG. 4 the actuator connector 20, 21 is provided at the intermediate frame 12, an alternative configuration allows the actuator connector 20, 21 to be directly connected to the lower segment 10 of the front end 8 of the body 4 of the combine 1. Since the intermediate frame 12 is also connected to this lower segment 10, forces will be transmitted more optimally than in conventional configurations. In FIG. 4, no optional or additional processing mechanism is shown in the intermediate frame 12, although it is contemplated that in other exemplary embodiments a processing mechanism, such as the dynamic feed roll module 6, may be included.

The intermediate frame 12 can be used to further standardize agricultural combine elements. As described above, the feeder 3 can have a standard length regardless of whether a DFR module is implemented or not. However, the intermediate frame 12 can also be provided with multiple first and/or second connecting means 16, 14 to be compatible with different upper segments 9 and/or lower segments 10 of different combines 1. In this manner, the intermediate frame 12 can serve as a connector between, on the one hand, multiple combines with different first and/or second connecting structures 15, 13 and, on the other hand, a standardized feeder 3.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

What is claimed is:

1. An agricultural combine comprising:
   a feeder;
   an actuator;
   a front end comprising an upper segment and a lower segment;
   a first connecting structure at the upper segment of the front end;
   a second connecting structure at the lower segment of the front end;
   an intermediate frame comprising:
      a feeder connector connecting to the feeder;
      a first connector connecting to the first connecting structure; and
      a second connector connecting to the second connecting structure; and
   an actuator connector connecting to the actuator at a location of the second connecting structure.

2. The agricultural combine of claim 1, wherein the intermediate frame further comprises rigid structural elements interconnecting the feeder connector with the second connector and interconnecting the feeder connector with the first connector.

3. The agricultural combine of claim 1, wherein second connector is formed as a clamp connecting the intermediate frame to the second connecting structure, wherein the clamp and the second connecting structure enable a rotation of the intermediate frame with respect to the second connecting structure when the clamp is engaged with the second connecting structure.

4. The agricultural combine of claim 3, wherein the second connecting structure is formed as a beam traversing the lower segment of the front end.

5. The agricultural combine of claim 4, wherein the clamp is formed as a substantially U-formed structure that is adapted to engage over the beam.

6. The agricultural combine of claim 1, wherein the first connector comprises multiple bolts rigidly connecting the intermediate frame to the first connecting structure.

7. The agricultural combine of claim 1, wherein the actuator connector is provided on the intermediate frame.

8. The agricultural combine of claim 7, wherein the intermediate frame further comprises rigid structural elements interconnecting the feeder connector with the actuator connector.

9. The agricultural combine of claim 1, wherein the intermediate frame is provided with a crop processing mechanism to process crop material between the feeder and the body of the combine.

10. The agricultural combine of claim 9, wherein the crop processing mechanism is a dynamic feed roll mechanism for removing stones from the crop material.

11. The agricultural combine of claim 1, wherein the feeder is pivotally connected to the feeder connector and wherein the actuator is connected to the actuator connector.

12. The agricultural combine of claim 11, further comprising a header mounting frame for connection to a header, wherein the feeder and the actuator are interconnected at a location of the header mounting frame.

13. An agricultural combine comprising:
- a front end comprising an upper segment and a lower segment;
- a header;
- a feeder connected to the header;
- an actuator;
- a first connecting structure at the upper segment of the front end;
- a second connecting structure at the lower segment of the front end;
- an intermediate frame connecting the feeder to the front end, the intermediate frame comprising:
  - a feeder connector connecting to the feeder;
  - a first connector connecting to the first connecting structure; and
  - a second connector connecting to the second connecting structure; and
- an actuator connector connecting to the actuator at a location of the second connecting structure.

14. The agricultural combine of claim 13, wherein the intermediate frame further comprises rigid structural elements interconnecting the feeder connector with the second connector and interconnecting the feeder connector with the first connector.

15. The agricultural combine of claim 13, wherein second connector is formed as a clamp connecting the intermediate frame to the second connecting structure, wherein the clamp and the second connecting structure enable a rotation of the intermediate frame with respect to the second connecting structure when the clamp is engaged with the second connecting structure.

16. The agricultural combine of claim 15, wherein the second connecting structure is formed as a beam traversing the lower segment of the front end.

17. The agricultural combine of claim 16, wherein the clamp is formed as a substantially U-formed structure that is adapted to engage over the beam.

18. The agricultural combine of claim 13, wherein the actuator connector is provided on the intermediate frame.

19. The agricultural combine of claim 18, wherein the intermediate frame further comprises rigid structural elements interconnecting the feeder connector with the actuator connector.

20. The agricultural combine of claim 13, wherein the feeder is pivotally connected to the feeder connector and wherein the actuator is connected to the actuator connector.

21. The agricultural combine of claim 20, further comprising a header mounting frame for connection to a header, wherein the feeder and the actuator are interconnected at a location of the header mounting frame.

* * * * *